March 23, 1965    E. O. H. EDBLOM ETAL    3,174,563
DEEP DRILLS HAVING AN ECCENTRIC BIT
Filed Feb. 27, 1963    2 Sheets-Sheet 1
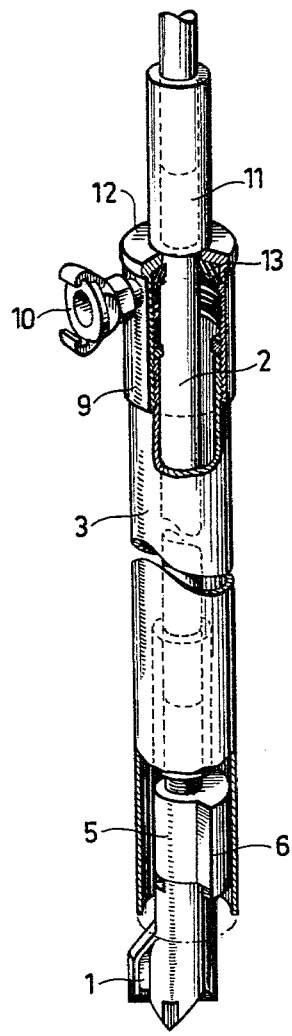
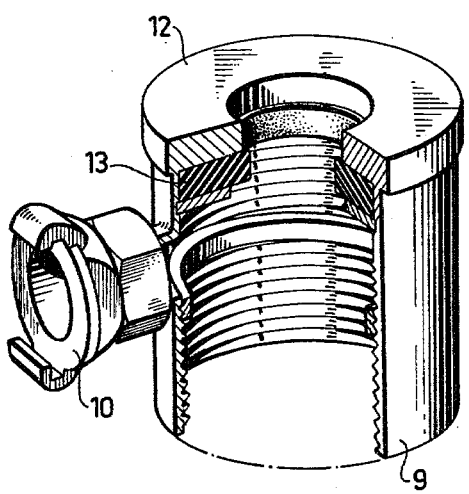
INVENTORS
Erik O. H. Edblom
Karl G. Lundbeck
Jan S. V. Roos
BY Watson, Cole, Grindle & Watson
ATTORNEYS

3,174,563
DEEP DRILLS HAVING AN ECCENTRIC BIT

Erik Ove Hildar Edblom, Tyreso, Karl Gunnar Lundbeck, Voullerim, and Jan Sigurd Valdemar Roos, Goteborg, Sweden, assignors to AB Skånska Cementgjuteriet, Stockholm, Sweden, a corporation of Sweden
Filed Feb. 27, 1963, Ser. No. 261,446
Claims priority, application Sweden, Mar. 1, 1962, 2,298/62
4 Claims. (Cl. 175—258)

The present invention relates to an improvement in deep drills with an eccentric bit of the type in which during drilling the drill bit is followed by a tube serving as a lining for the drilled hole.

In prior art drills of this type the eccentric drill bit is provided with a centrically operating pilot drill which serves as a guide for the following eccentric drill bit so as to eliminate the risk of wry drilling.

A disadvantage in eccentric drill bits of this type is that the tube serving to line the hole cannot be moved down in close proximity to the bottom of the hole but must stop at a distance from the bottom corresponding to the total vertical length of the drill bit and the pilot drill, because the drill bit must be capable of being raised unimpeded by the lining tube to such a level that the pilot drill is free, so as to allow the drill bit to move laterally to a position in which the drill bit can be retracted through the lining tube.

Another disadvantage is that the pilot drill if the earth conditions are unfavourable does not ensure a reliable and accurate guiding of the drill bit.

The object of the present invention is to remove the above disadvantages of prior art deep drills with eccentric bits. The drill according to the present invention comprises an eccentric sleeve mounted rotatably on the end of the drill rod adjacent the bit or on a joining rod connecting the drill rod to the drill bit, the eccentric portion of said eccentric sleeve serving as a guiding lug and being adapted during drilling to be positioned diametrically opposite to the most eccentric part of the drill bit and be pressed by the drill bit into engagement with the lining tube to center the drill rod in the tube, said eccentric sleeve being further adapted, in order to enable the drill bit to be drawn up through the tube, to be turned around the drill rod to a position where the eccentric portions of the eccentric sleeve and the drill bit coincide.

This and other features characteristic of this invention will be described more in detail below with reference to the embodiment illustrated on the accompanying drawings.

FIGURE 1 shows a deep drill with the associated lining tube in perspective view and partly in section.

FIGURE 2 shows the upper portion of the lining tube, also in perspective view and in section.

Figure 3:
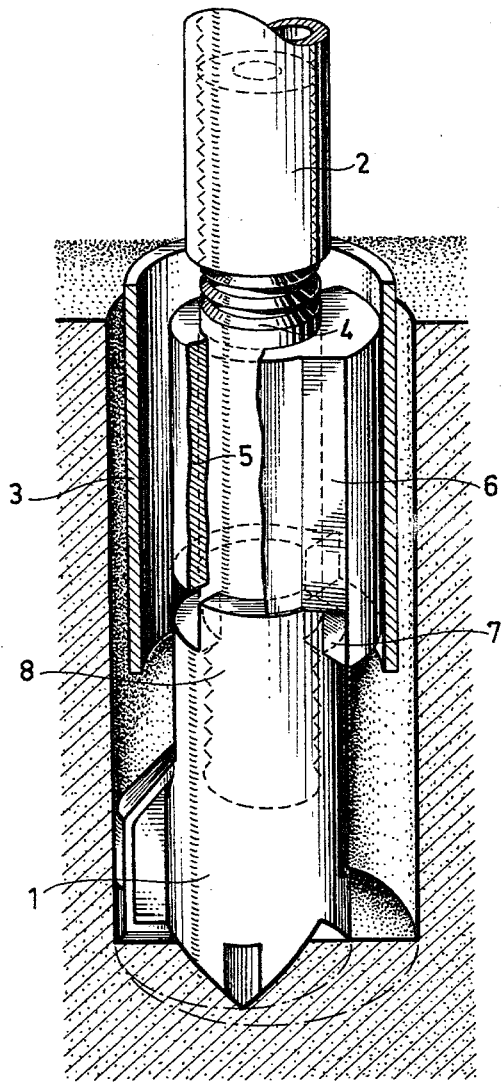
FIGURE 3 shows in a similar manner the lower portion of the drill with its eccentric drill bit.

Referring to the drawings, the numeral 1 designates the eccentric drill bit of the deep drill, which is constructed in a manner known per se and is carried by a drill rod 2 which is adapted to be connected in any suitable manner to the drilling machine (not shown). For lining the hole made by means of the drill, there is provided a lining tube 3, the external diameter of which corresponds substantially to the diameter of the hole and the internal diameter of which is at least equal to the diameter of the drill bit. In accordance with this invention, there is provided an eccentric sleeve 5 which is rotatably mounted around the end of the drill rod 2 adjacent the drill bit or around a connecting rod 4 joining the lower end of the drill rod to the drill bit, the eccentric portion of said sleeve serving as a guiding lug 6 adapted during drilling to be situated diametrically opposite to the most eccentric portion of the drill bit and to be pressed into engagement with the tube by the forces acting on the drill bit. The eccentricity of the eccentric sleeve is so selected that the drill rod will be accurately centered in the tube. To maintain the eccentric sleeve 5 in this position during drilling, i.e. when the drill is turned (anti-clockwise in the example illustrated) at the same time as it is subjected to blows and shocks, the sleeve has an abutment 7 which cooperates with a corresponding abutment 8 at the upper end of the drill bit. These two abutments 7 and 8 are so constructed that the eccentric sleeve by the entrainment produced by the abutments in the intended rotating movement during drilling is kept in the position contemplated, while when turned in the opposite direction the sleeve can turn 180° relative to the drill rod 2 or the connecting rod 4, i.e. so that the eccentric sleeve 5 coincides with the drill bit. Thereby, it will be possible to displace the drill rod and the drill bit laterally sufficient to align the axis of the drill bit with the axis of the lining tube 3 so as to enable the drill to be drawn up.

To enable the hole to be flushed during or after drilling, the top end of the lining tube has a connecting piece 9 with a nipple 10 for the introduction of flushing water. The downfeed of the lining tube 3 can take place in a well-known manner by means of an abutment 11 on the drill rod 2, which cooperates with the top member 12 of the connecting piece, which member 12 also serves to seal around the drill rod. The sealing action can be augmented by a sealing member 13.

The invention is not limited to the embodiment disclosed, but can be varied in many ways within the scope of the claims.

We claim:

1. A deep drill with an eccentric drill bit and of the type wherein the drill bit during drilling is followed by a tube serving as a lining for the drilled hole, comprising an eccentric sleeve mounted rotatably on the end of the drill rod adjacent the drill bit and an eccentric portion on said eccentric sleeve serving as a guide lug, cooperating means on the sleeve and the drill bit whereby during drilling the eccentric portion of the sleeve is held diametrically opposed to the eccentric portion of the drill bit and the guide lug is kept by the drill bit in engagement with the lining tube to center the drill rod in the tube, and said eccentric sleeve being adapted, in order to enable the drill bit to be drawn up through the tube, to be turned relative to the drill rod to a position in which the eccentric portions of the eccentric sleeve and the drill bit coincide.

2. A drill as in claim 1, in which the end of the eccentric sleeve facing the drill bit has an abutment thereon adapted to cooperate with a corresponding abutment on the drill bit, said abutments being so disposed that during turning of the drill in the drilling direction, the eccentric sleeve is driven by the drill bit and is kept in a fixed position relative to the drill bit.

3. A drill as in claim 1, in which the end of the eccentric sleeve facing the drill bit has an abutment thereon adapted to cooperate with a corresponding abutment on the drill bit, said abutments being so disposed that during turning of the drill in the drilling direction, the eccentric sleeve is driven by the drill bit and is kept in a fixed position relative to the drill bit, and the abutments of the eccentric sleeve and the drill bit being arranged so that when the drill is turned in the opposite direction the eccentric sleeve is permitted to turn relatively to the drill rod to a position such that the eccentric portions of the eccentric sleeve and the drill bit coincide to enable the drill to be drawn up through the tube.

4. A deep drill with an eccentric drill bit and of the type wherein the drill bit during drilling is followed by a tube serving as a lining for the drilled hole, comprising an eccentric sleeve mounted rotatably on the end of the drill rod adjacent the drill bit on a connecting rod joining said end of the drill rod to the drill bit, and an eccentric of the drill rod to the drill bit, said drill bit having an eccentric portion thereon, an eccentric portion on said eccentric sleeve serving as a guide lug, and means on the sleeve and the drill bit to position the guide lug of the sleeve and the eccentric portion of the drill bit diametrically opposed whereby the lug is kept by the drill bit in engagement with the lining tube to center the drill rod in the tube, and said eccentric sleeve being adapted, in order to enable the drill bit to be drawn up through the tube, to be turned relative to the drill rod to a position in which the eccentric portions of the eccentric sleeve and the drill bit coincide.

References Cited in the file of this patent

UNITED STATES PATENTS

| | | |
|---|---|---|
| 712,887 | Wyczynski | Nov. 4, 1902 |
| 1,260,533 | Freeon | Mar. 26, 1918 |
| 1,510,222 | Herman | Sept. 30, 1924 |

FOREIGN PATENTS

| | | |
|---|---|---|
| 33,343 | Austria | Jan. 15, 1908 |